Feb. 2, 1932. V. GUTMANN ET AL 1,843,671
ARMORED CABLE SECTION FOR SECTIONALIZED CABLES
Filed Feb. 17, 1928
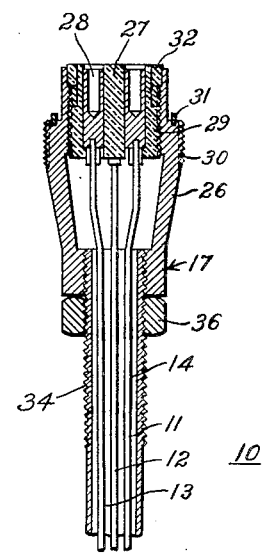
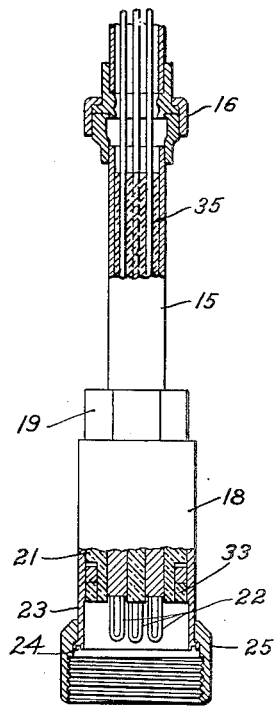
INVENTORS
*Victor Gutmann
and Ludwig Steiner.*
BY
ATTORNEY Patented Feb. 2, 1932

1,843,671

UNITED STATES PATENT OFFICE

VICTOR GUTMANN, OF NUREMBERG, AND LUDWIG STEINER, OF BERLIN, GERMANY, ASSIGNORS TO WESTINGHOUSE ELECTRIC AND MANUFACTURING COMPANY, A CORPORATION OF PENNSYLVANIA

ARMORED CABLE SECTION FOR SECTIONALIZED CABLES

Application filed February 17, 1928, Serial No. 255,167, and in Germany May 20, 1927.

The invention relates generally to cables for conducting electric power and more particularly to armored cable sections for sectionalized cables.

In supplying electric current to heaters, pumps or the like, which may be submerged in liquid, such, for example, as water, or oil in an oil well, it is desirable to use a sectionalized cable extending from the surface of the ground to the heater or pump at or near the bottom of the bore hole.

Each cable section usually comprises one or more insulated conductors encased in a rigid metal tube or conduit. Coupling heads are provided on the ends of each cable section and they may be utilized to connect the several cable sections together. The coupling heads are provided with receptacles to which the conductors are attached and which have contact members for connecting the conductors of the several sections together.

When coupling heads of the ordinary type are employed, considerable difficulty is experienced in assembling the individual sections, as the conductors must extend beyond the ends of the tube in order that they may be connected to the contact members of the receptacle and the latter disposed to permit it to be drawn out of the head. After a connection is made, the receptacle must be pushed back into the main body portion of the head, and, since the conductors may entirely fill the cross-sectional space of the tube, they will not yield readily in a longitudinal direction and, consequently, the receptacle cannot easily be placed in its proper position.

The object of this invention, generally stated, is to provide a cable section which shall be simple in construction and assemblage and readily and economically manufactured.

A more specific object of the invention is to provide for greater facility in connecting the electric conductors and the coupling heads of cable sections.

A further object of the invention is to provide for the introduction of a moisture seal into the protective casings provided for cable sections.

Other objects of the invention will be apparent from the following description, taken in conjunction with the accompanying drawing in which the single figure is a view, partly in section and partly in side elevation, of a cable section showing details of its construction.

Referring now to the drawing, 10 designates generally a cable section, a plurality of which may be connected to provide a current-carrying cable of any desired length.

As shown, the cable section comprises a plurality of insulated conductors 11, 12 and 13 enclosed within a plurality of tubular casing sections 14 and 15 which are joined together by means of a coupling 16. The ends of the insulated conductors terminate in coupling heads 17 and 18 which are attached to the respective ends of the cable section.

As shown, the lower coupling head 18 comprises a main body portion 19 which contains an insulating body member or receptacle 21. The insulating body member 21 carries a plurality of plug members 22 which protrude from the insulating body portion 21 and are protected by a sleeve extension 23 of the main body portion 19. The lower edge of the protecting sleeve 23 is turned to extend outwardly to provide a collar 24 which engages with the coupling sleeve 25.

The upper coupling head 17 comprises a main body portion 26 which is adapted to contain an inner insulating body member 27, as shown. The member 27 is provided with a plurality of sleeve terminal members 28 which are arranged to receive the plug members 22 of another cable section. The ends of the conductors may be attached to the sleeve terminals 28 in any suitable manner, such, for example, as by soldering.

The inner insulated body member 27 may be secured against longitudinal movement in any desired manner and, in this particular embodiment of the invention, it has its outer surface threaded to engage with the internally threaded portion 29 of the main body member 26. The main body member 26 is also externally threaded at 30 to engage a coupling sleeve, similar to 25, of another cable section.

To provide an external moisture seal for the cable joint, an annular copper ring 31 is partially embedded in the shoulder portion of the upper head 17 and is disposed to enter an annular groove provided in the collar 24 of the next cable section.

As a further means of preventing moisture from entering the joint, an internal seal is provided which comprises a rubber ring 32 in the upper head and a similar ring 33 in the lower head which are pressed tightly together when the ends of two cable sections are coupled. Thus, it will be seen that, when the coupling sleeve 25 of a coupling head 18 is engaged with the threaded portion 30 of a coupling head 17 and securely tightened into place, the copper ring 31 will be pressed tightly into the groove in the collar 24 and the rubber rings 32 and 33 will be pressed tightly together.

In order to prevent any moisture which may collect upon the inner surface of the tubular casing from draining downwardly into a joint, a moisture seal 35 is provided. The seal 35 may consist of any suitable moisture-proof insulating compound and is preferably introduced through the opening coupling 16 in a liquid state and allowed to harden and thereby completely seal the entire open space above the lower insulating body member or receptacle 21.

In order that a more comprehensive understanding of the invention may be obtained, a detail description of the method of assembling the conductor section will now be given.

The insulated conductors 11, 12 and 13 are first attached to the plug members 22 of the lower connecting head in any suitable manner. The free ends of the conductors are then drawn through the tube sections 14 and 15, which are disconnected at the coupling 16. Before the coupling 16 is assembled, the insulating compound, forming the moisture seal 35, is poured into place, and the tube section 15 may be sealed with the compound to any desired height. The tubular casing sections 14 and 15 are then connected together by means of the coupling 16, and the conductors are cut to the desired length. In attaching the conductors 11, 12 and 13 to the sleeve members 28 of the upper head, the lock nut 36 and main body portion 26 of the connecting head 17 are screwed backwards along the tubular casing section 14 until the inner body portion 27 is completely disengaged from the threaded portion 29 of the main body portion 26. It will be readily understood that this movement is limited only by the length of the threaded portion 34 of the tubular casing section 14 and, therefore, the head 17 may be removed to such distance from the terminal connections as to make them conveniently accessible. When the connections are completed, the main body portion 26 is screwed outwardly until the ends of the insulating body is nearly in line with the upper end of the main body portion. The lock nut 36 is then utilized to secure the body portion 26 in its proper position.

It may be stated, in conclusion, that, while the illustrated example constitutes a practical embodiment of our invention, it is to be understood that many modifications of the illustrated embodiment may be made without departing from the spirit of the invention, as defined in the appended claims.

We claim as our invention:

1. In a cable section, in combination, a plurality of conductors, a casing for the conductors, a coupling head mounted on each end of the casing, one of said coupling heads being comprised of an inner terminal structure and an outer body portion, said outer body portion being adjustable inwardly along the casing to expose the inner terminal structure to permit access to the conductor ends.

2. In a cable section, in combination, a plurality of conductors, a casing for the conductors, a coupling head mounted on each end of the casing, one of said coupling heads being comprised of an inner terminal structure and an outer body portion, said outer body portion being rotatably adjustable inwardly along the casing to expose the inner terminal structure and conductor ends and outwardly along the casing to engage the inner terminal structure after the conductors have been attached to said terminal structure.

3. A submersible sectionalized cable, a single section of which comprises a plurality of heads, a plurality of continuous conductors having their ends fastened in the heads, a casing, having a break intermediate its ends, for enclosing the conductors, a water seal provided in the casing at a predetermined location, and a coupling for joining the casing at the break, said coupling being disposed to be opened to permit entry into the casing to introduce the water seal at said predetermined location.

4. A submersible sectionalized cable, a single section of which comprises a casing having a break intermediate its ends, continuous conductors disposed in the casing, main coupling heads mounted on the end of the casing for engaging and holding the ends of the conductors, a coupling for joining the casing at the break, and a water seal in the casing located adjacent the coupling to prevent seepage of water into the main coupling heads.

In testimony whereof, we have hereunto subscribed our names this 11th day of January, 1928.

VICTOR GUTMANN.
LUDWIG STEINER.